No. 650,740. Patented May 29, 1900.
C. A. WRIGHT.
VEHICLE WHEEL.
(Application filed Oct. 21, 1898.)

(No Model.)

Witnesses:
Arthur Ashley
R. H. F. Ogburn

Inventor
Charles A. Wright
By L. Deane & Son
Attorneys

UNITED STATES PATENT OFFICE.

CHARLES A. WRIGHT, OF BROCKTON, MASSACHUSETTS.

VEHICLE-WHEEL.

SPECIFICATION forming part of Letters Patent No. 650,740, dated May 29, 1900.

Application filed October 21, 1898. Serial No. 694,208. (No model.)

*To all whom it may concern:*

Be it known that I, CHARLES A. WRIGHT, a citizen of the United States, residing at Brockton, in the county of Plymouth and State of Massachusetts, have invented certain new and useful Improvements in Vehicle-Wheels, of which the following is a specification, reference being had therein to the accompanying drawings.

My invention relates to vehicle-wheels; and its object is to provide a wheel-hub so constructed as to facilitate the tensioning of the spokes.

The novel features of the device will be fully described hereinafter and defined in the appended claims.

Figure 1:
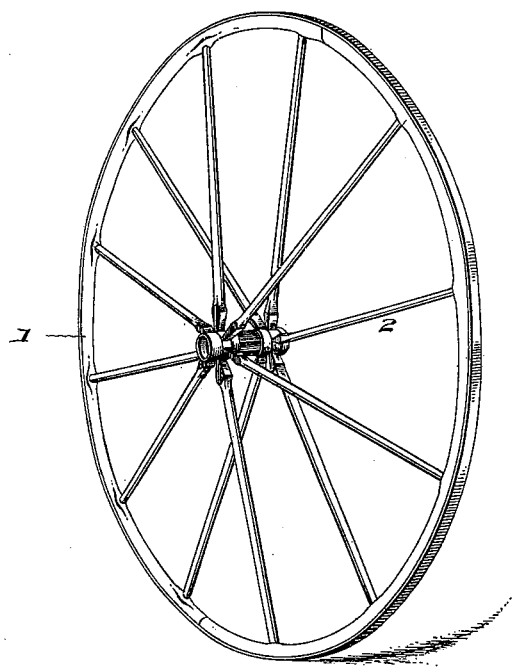
Figure 2:
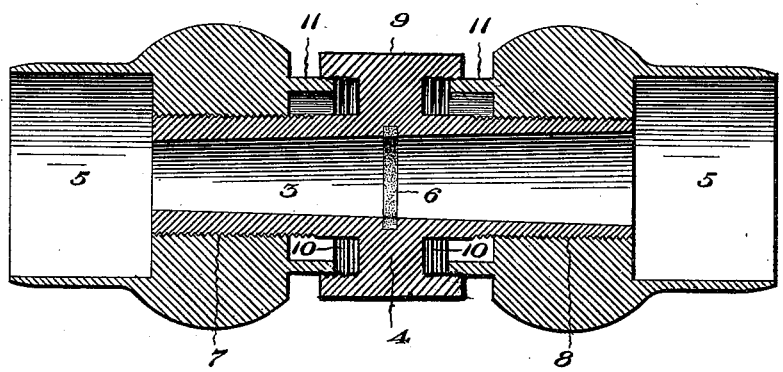

In the accompanying drawings, Figure 1 is a perspective view of a wheel embodying the invention, and Fig. 2 is an enlarged longitudinal central section of the hub.

The reference-numeral 1 designates the wheel felly and tire, and 2 the spokes.

The hub consists of a sleeve 3, formed with a central integral collar 4 and adjustable ends 5. The sleeve 3 is preferably formed with an internal annular oil-groove 6, and its ends 7 and 8 are externally screw-threaded with threads of opposite pitch, and the end sections 5 of the hub are correspondingly threaded to engage the threads of the sleeve. Surrounding the collar 4 of the sleeve is a ring 9, preferably made integral with the collar and having its ends 9ª projecting laterally beyond the sides of the collar, leaving spaces 10 between the ring and sleeve. These spaces are closed by annular flanges 11, projecting inwardly from the ends 5. The periphery of the ring 9 is preferably of polygonal form to facilitate the application of a wrench thereto. The flanges 11 are oppositely externally threaded for engagement with corresponding internal threads on the interior of the projecting ends 9ª of the ring. The purpose of this construction is to effect the application of the actuator (comprehended by the sleeve 3 and ring 9) to the end sections at a plurality of points—that is to say, the adjustment of the spoke-retaining sections would be attended with more or less binding of the engaging threads of the sleeve ends 7 and 8 as the movement of these sections is resisted by the spokes. In order to overcome this tendency, therefore, I provide this second-thread connection between the same elements, but at a greater distance from the center or axis, thus distributing the strain and in great measure overcoming this tendency to bind. It is possible, however, to omit these second threads, although the specific structure shown and described is otherwise essential, as it is desirable to have the wrench-engaging surface practically in the circumferential plane of the end or hub sections, and in order to protect the engaging surfaces of the spoke-sections and sleeve 3 from dust and dirt and at the same time allow for relative movement of the parts the flanges 11, telescoping with the projecting ring ends, must be provided.

The ends of the spokes are secured to the ends 5 of the hub, as shown, and their outer ends to the felly 1.

The collar 4 enlarges the circumference of the sleeve at the central portion of the latter, thus affording an enlarged grasping-surface for the wrench in turning the sleeve and correspondingly increasing the leverage in turning said sleeve, and the lateral end extensions of said ring 9 increase the width of the grasping-surface.

The closing of the annular spaces 10 by the flanges 11 of the ends 5 prevents the accumulation of dirt below the ends 9ª of the ring 9.

By turning the hub-sleeve the hub ends are moved in or out, owing to the right and left threaded engagement between these parts.

I claim—

1. In a wheel the combination with a felly and spokes of a hub comprising a sleeve having oppositely externally threaded ends an intermediate annular collar surrounded by a ring projecting beyond the sides thereof, and a pair of spoke-retaining sections oppositely internally threaded for engagement with the sleeve and provided respectively with annular flanges interfitting with the opposite ends of the ring.

2. In a wheel, the combination with a felly and spokes, of a hub comprising a sleeve oppositely externally threaded at its ends and provided with an intermediate exterior annular collar and a ring having an angular exterior face, oppositely interiorly threaded spoke-retaining sections on the sleeve and provided with oppositely-extending annular flanges interfitting with the ring, the contiguous faces of ring and flanges being correspondingly threaded.

In testimony whereof I affix my signature in presence of two witnesses.

CHARLES A. WRIGHT.

Witnesses:
FRANK C. WOODWARD,
HOSEA KINGMAN.